United States Patent
Barton et al.

(10) Patent No.: US 12,452,895 B2
(45) Date of Patent: Oct. 21, 2025

(54) ADAPTING TRANSMISSION SCHEDULES FOR A RADIO FREQUENCY (RF) ENVIRONMENT

(71) Applicant: Cisco Technology, Inc., San Jose, CA (US)

(72) Inventors: Robert E. Barton, Richmond (CA); Jerome Henry, Pittsboro, NC (US); Maik Guenter Seewald, Nuremberg (DE); Malcolm Muir Smith, Richardson, TX (US)

(73) Assignee: Cisco Technology, Inc.

( * ) Notice: Subject to any disclaimer, the term of this patent is extended or adjusted under 35 U.S.C. 154(b) by 564 days.

(21) Appl. No.: 17/820,421

(22) Filed: Aug. 17, 2022

(65) Prior Publication Data

US 2024/0064788 A1 Feb. 22, 2024

(51) Int. Cl.
*H04W 72/12* (2023.01)
*H04W 72/50* (2023.01)
*H04W 28/08* (2023.01)
*H04W 72/543* (2023.01)

(52) U.S. Cl.
CPC ...... *H04W 72/535* (2023.01); *H04W 28/0983* (2020.05); *H04W 72/543* (2023.01)

(58) Field of Classification Search
CPC ............. H04W 72/535; H04W 72/543; H04W 28/0983
USPC ...................................................... 370/329
See application file for complete search history.

(56) References Cited

U.S. PATENT DOCUMENTS

| | | | |
|---|---|---|---|
| 11,388,060 B1 * | 7/2022 | Subramanian | G06F 13/28 |
| 2019/0253339 A1 * | 8/2019 | Mehmedagic | H04L 45/3065 |
| 2020/0137615 A1 * | 4/2020 | Joseph | H04W 24/02 |
| 2021/0022154 A1 * | 1/2021 | Cavalcanti | H04W 72/12 |
| 2021/0075675 A1 * | 3/2021 | Cavalcanti | H04L 41/0823 |
| 2022/0030533 A1 | 1/2022 | Munz et al. | |
| 2022/0053361 A1 | 2/2022 | Thubert et al. | |
| 2022/0312258 A1 * | 9/2022 | Varga | H04L 47/283 |
| 2022/0353195 A1 * | 11/2022 | Wei | H04L 41/122 |
| 2023/0308898 A1 * | 9/2023 | Oktay | H04W 24/02 |

FOREIGN PATENT DOCUMENTS

| | | | |
|---|---|---|---|
| CN | 115208751 | * | 10/2022 |
| WO | 2019132861 A1 | | 7/2019 |
| WO | 2020200432 A1 | | 10/2020 |

* cited by examiner

*Primary Examiner* — Jungwon Chang
(74) *Attorney, Agent, or Firm* — Merchant & Gould P.C.

(57) ABSTRACT

Adapting transmission schedules in a Radio Frequency (RF) environment may be provided. A Central Network Controller (CNC) of a Time Sensitive Network (TSN) may determine that a data path to a client device comprises a wireless link. The CNC of the TSN may generate a proposed transmission schedule for the time sensitive traffic to the client device through the wireless link in response to determining that the data path to the client device comprises the wireless link. The CNC may provide the proposed transmission schedule to a Wireless Network Controller (WLC) of the wireless link. The CNC may receive a confirmation from the WLC that the proposed transmission schedule can be met. The proposed transmission schedule may be configured in response to receiving the confirmation.

19 Claims, 4 Drawing Sheets

ADAPTING TRANSMISSION SCHEDULES FOR A RADIO FREQUENCY (RF) ENVIRONMENT

TECHNICAL FIELD

The present disclosure relates generally to transmission schedules in a radio frequency environment.

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, that is the physical location where Wi-Fi access to a WLAN is available.

Prior to wireless networks, setting up a computer network in a business, home, or school often required running many cables through walls and ceilings in order to deliver network access to all of the network-enabled devices in the building. With the creation of the wireless AP, network users are able to add devices that access the network with few or no cables. An AP connects to a wired network, then provides radio frequency links for other radio devices to reach that wired network. Most APs support the connection of multiple wireless devices. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
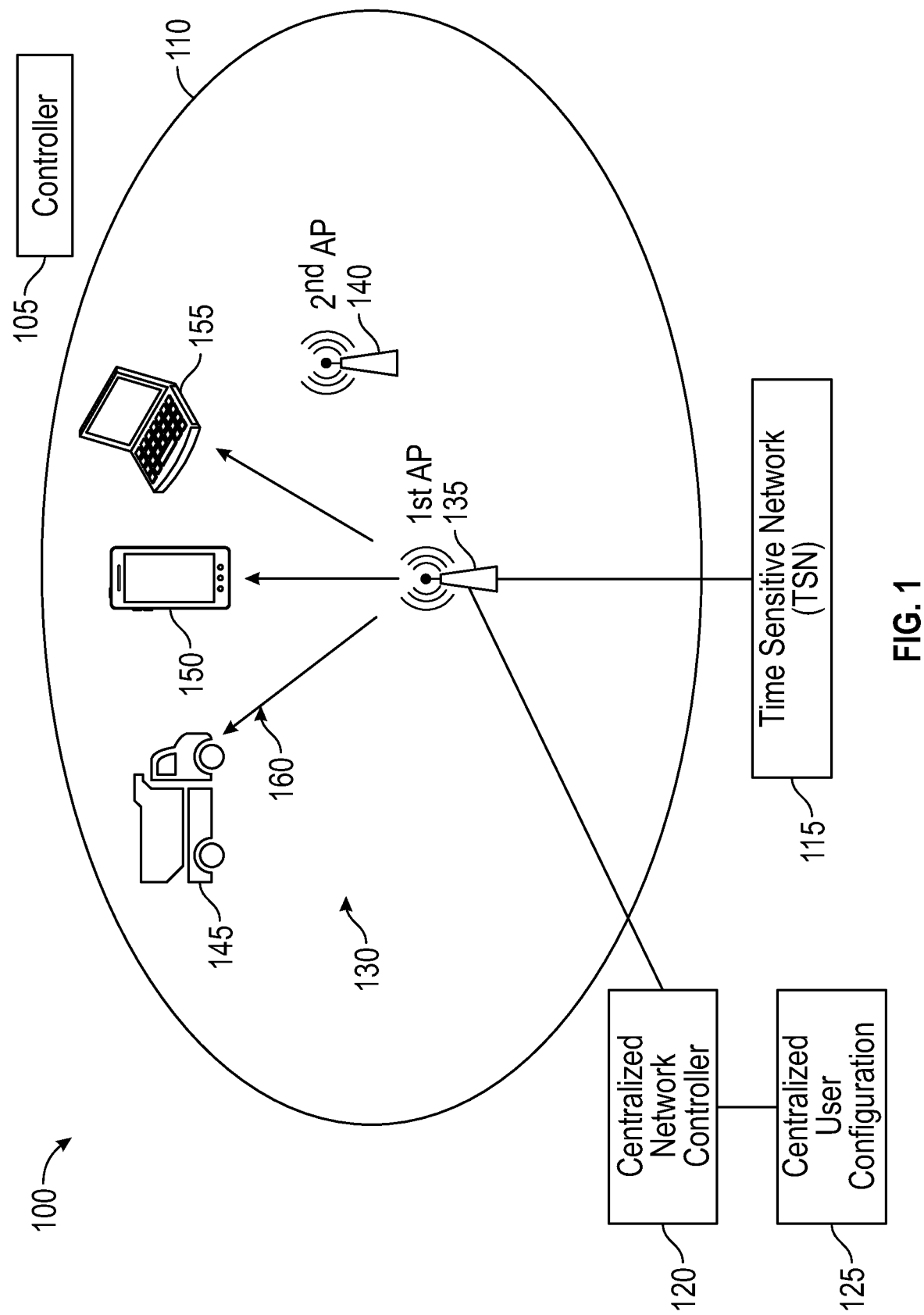
FIG. 1 is a block diagram of an operating environment for adapting transmission schedules in a radio frequency environment.

Adapting transmission schedules in a Radio Frequency (RF) environment may be provided. A Central Network Controller (CNC) of a Time Sensitive Network (TSN) may determine that a data path to a client device comprises a wireless link. The CNC of the TSN may generate a proposed transmission schedule for time sensitive traffic to the client device through the wireless link in response to determining that the data path to the client device comprises the wireless link. The CNC may provide the proposed transmission schedule to a Wireless Network Controller (WLC) of the wireless link. The CNC may receive a confirmation from the WLC that the proposed transmission schedule can be met. The proposed transmission schedule may be configured in response to receiving the confirmation that the proposed transmission schedule can be met.

Both the foregoing overview and the following example embodiments are examples and explanatory only and should not be considered to restrict the disclosure's scope, as described, and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Time Sensitive Networking (TSN) may be a set of Institute of Electrical and Electronics Engineers (IEEE) 802 Ethernet sub-standards that are defined by the IEEE TSN task group. These standards may enable deterministic real-time communication over Ethernet. TSN may achieve determinism over the Ethernet by using time synchronization and a transmission schedule that may be shared between network components. By defining queues based on time, TSN may ensure a bounded maximum latency for scheduled traffic through switched networks. This may mean that in a TSN, latency of critical scheduled communication may be guaranteed.

In control applications with strict deterministic requirements, such as those found in automotive and industrial domains, TSN may offer a way to send time-critical traffic over a standard Ethernet infrastructure. This may enable the convergence of all traffic classes and multiple applications in one network. In practice, this may mean that the functionality of standard Ethernet may be extended so that message latency may be guaranteed through switched networks. Critical and non-critical traffic may be converged in one network, and higher layer protocols may share the network infrastructure.

Establishing TSN in wireless environments (e.g., Wi-Fi) may be complex. For example, in open mines, trucks (i.e., stations) may need TSN data exchanges for real time automated driving functions. The amount of data that is to be exchanged may be known and predictable. The truck, however, may be moving and the Radio Frequency (RF) signal may be constantly changing. In such an environment, a "late condition" may appear where a TSN controller may instruct a scheduler to allocate Resource Units (RUs) based on the truck's current data rate, but the truck may move and may fail to obtain the bandwidth it may need for the current data burst.

When the truck is approaching an Access Point (AP), or moving to a region of low RF variability, this may result in wasted bandwidth. In other words, the truck may have finished transmitting the useful information before the end of the allocated schedule, and may end up sending empty padding to complete the schedule. When the truck is moving away from the AP, or through a region of high RF variability (e.g., destructive interference, or other metallic objects on a path causing large signal stochasticity), this may result in lost data (e.g., not transmitted) that may be problematic.

While wireless (e.g., Wi-Fi 6 or Wi-Fi 7) may be an accessible solution, the same challenge referred to above may be experienced by a host of other TSN applications where RF conditions may vary. Accordingly, there may be a need for a process that may inform a wireless scheduler, not only about a station's current RF conditions, but also about its predicted location and RF condition changes over the course of a next scheduled interval.

Embodiments of the disclosure may provide processes where a wireless network controller or an AP may negotiate with a TSN controller for an acceptable schedule for critical flows. The processes may allow the wireless network to meet the negotiated schedule within tolerance levels. In addition, the processes may allow the wireless network controller to make changes to the AP's function (such as, prioritizing TSN clients, changing Modulation Coding Schemes (MCS) levels, restricting other clients of lower priority, etc.) to meet the negotiated schedule. In effect, the processes disclosed herein may allow a wireless network to extend the TSN domain into the Wi-Fi 6 and Wi-Fi 7 domain.

FIG. 1 shows an operating environment 100 for adapting transmission schedules in an RF environment. As shown in FIG. 1, operating environment 100 may comprise a controller 105, a coverage environment 110, a Time Sensitive Network (TSN) 115, a Centralized Network Controller (CNC) 120 server, and a Centralized User Configuration (CUC) 125 server. Coverage environment 110 may be an RF environment (i.e., Wi-Fi 6, Wi-Fi 7, etc.) and may comprise, but is not limited to, a Wireless Local Area Network (WLAN) comprising a plurality of stations 130. Plurality of stations 130 may comprise a plurality of Access Points (APs) and a plurality of client devices. The plurality of APs may provide wireless network access (e.g., access to the WLAN) for the plurality of client devices. The plurality of APs may comprise a first AP 135 and a second AP 140. Each of the plurality of APs may be compatible with specification standards such as, but not limited to, the Institute of Electrical and Electronics Engineers (IEEE) 802.11 specification standard for example.

CUC 125 may obtain requirements from end-devices (e.g., plurality of stations 130) or may detect transmission availability based on sensor data. Once communication relations between sending devices (i.e., talkers) and receiving devices (i.e., listeners) has been established, that information may be transferred to CNC 120. CNC 120 may have full and global knowledge of network resources and topology. CNC 120 may then use this information to find a data path that fits the communication requirements between a talker and a listener. CNC 120 may provide scheduling information (e.g., Orthogonal Frequency-Division Multiple Access (OFDMA) scheduling information) to controller 105.

Controller 105 may communicate with CNC 120 and control the wireless network (i.e., the WLAN) comprising plurality of APs for example. In other words, controller 105 may schedule TSN transmissions in the wireless network comprising plurality of APs. Controller 105 may comprise a Wireless Local Area Network controller (WLC) and may provision coverage environment 110 (e.g., the WLAN). Controller 105 may allow the plurality of client devices to join coverage environment 110. In some embodiments of the disclosure, controller 105 may be implemented by a Digital Network Architecture Center (DNAC) controller (i.e., a Software-Defined Network (SDN) controller) that may configure information for coverage environment 110 in order to provide transmission schedules in an RF environment.

Ones of the plurality of client devices may comprise, but are not limited to, a smart phone, a personal computer, a tablet device, a mobile device, a telephone, a remote control device, a set-top box, a digital video recorder, an Internet-of-Things (IoT) device, a network computer, a router, an Automated Transfer Vehicle (ATV), a drone, an Unmanned Aerial Vehicle (UAV), or other similar microcomputer-based device. In the example shown in FIG. 1, the plurality of client devices may be TSN devices and may comprise a first client device 145 (e.g., a mining haul truck), a second client device 150 (e.g., a smart phone), and a third client device 155 (e.g., a laptop computer). A client device (e.g., first client device 145) of the plurality of client devices may communicate with one or more of the plurality of APs (e.g., first AP 135) over a wireless link 160.

The elements described above of operating environment 100 (e.g., controller 105, CNC 120, CUC 125, first AP 135, second AP 140, first client device 145, second client device 150, and third client device 155) may be practiced in hardware and/or in software (including firmware, resident software, micro-code, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 4, the elements of operating environment 100 may be practiced in a computing device 400.

Figure 2:
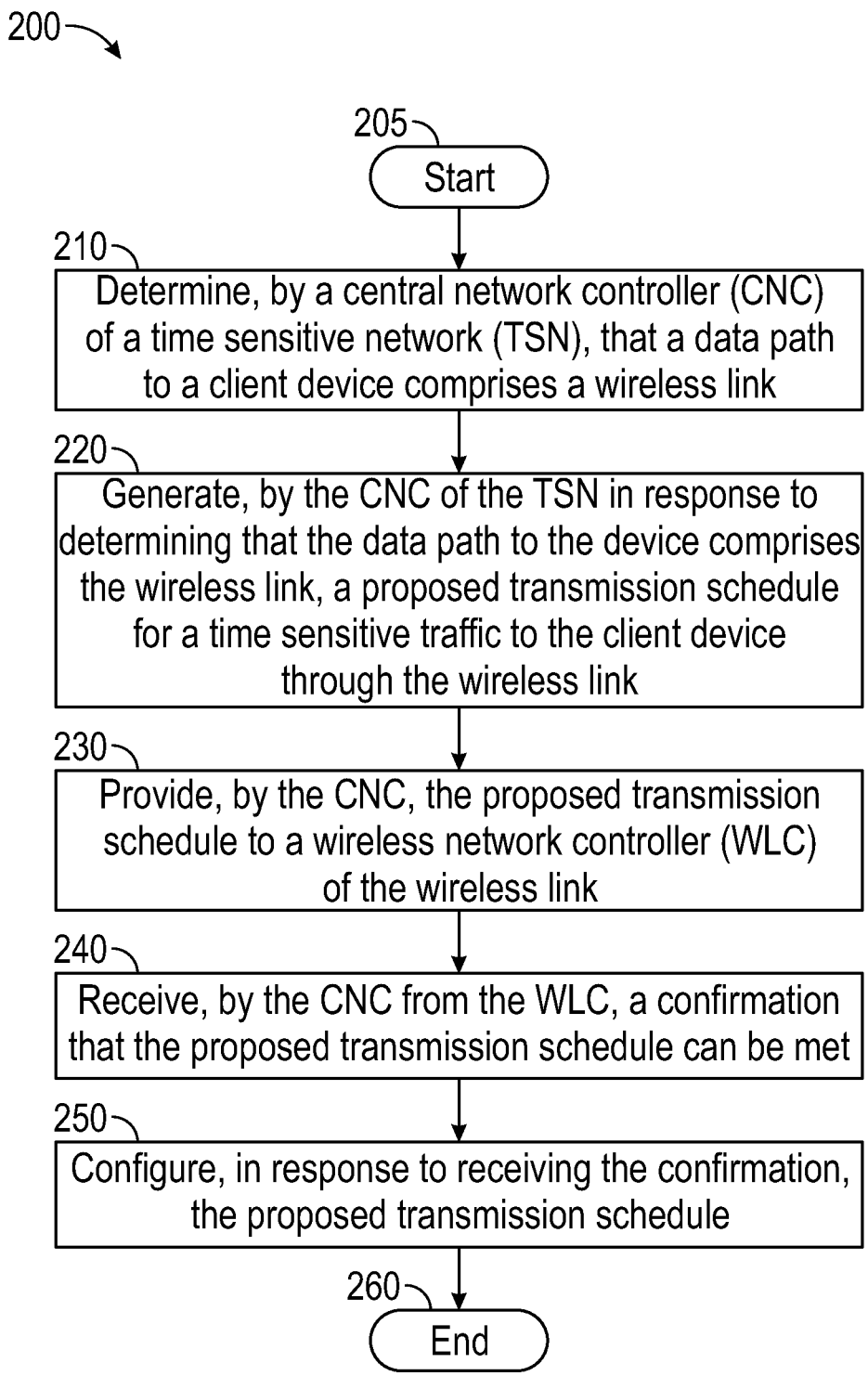
FIG. 2 is a flow chart of a method for configuring transmission schedules in a radio frequency environment.

FIG. 2 is a flow chart setting forth the general stages involved in a method 200 consistent with embodiments of the disclosure for configuring transmission schedules in an RF environment. Method 200 may be implemented using CNC 120 as described in more detail above with respect to FIG. 1. Ways to implement the stages of method 200 will be described in greater detail below.

Method 200 may begin at starting block 205 and proceed to stage 210 where CNC 120 of TSN 115 may determine that a data path to a client device (i.e., first client device 145) may comprise wireless link 160. The data path may include, for example, a wireless station (e.g., first client device 145) communicating with another station (e.g., first AP 135) that may be wired or wireless over wireless link 160. CNC 120, for example, may be configured to determine a network path or a data path from a source to a destination (i.e., an e2e path) in operating environment 100. CNC 120 may determine that the data path to first client device 145 may comprise wireless link 160 between first AP 135 and first client device 145.

From stage 210, where CNC 120 determines that the data path to the client device (e.g., first client device 145) comprises wireless link 160, method 200 may advance to stage 220 where CNC 120 may generate a proposed transmission schedule for time sensitive traffic to the client device (e.g., first client device 145) through wireless link 160. CNC 120 may generate the proposed transmission schedule in response to determining that the data path to the client device (e.g., first client device 145) comprises wireless link 160. CNC 120 may determine the proposed transmission schedule for a configurable interval based on a network condition or an RF profile of wireless link 160 and an amount of data to be exchanged by first client device 145 over the configurable interval. CNC 120, for example, may be configured to propose or create transmission schedules for the time sensitive traffic from one or more applications in operating environment 100.

Once CNC 120 generates the proposed transmission schedule for the time sensitive traffic in stage 220, method 200 may continue to stage 230 where CNC 120 may provide the proposed transmission schedule to the WLC (e.g., controller 105) of wireless link 160. CNC 120 may provide the proposed transmission schedule to the WLC (e.g., controller 105) as a request and not as a direct configuration. It may be up to the WLC (e.g., controller 105) to determine whether the proposed transmission schedule may be met on wireless link 160. In case of a wired Ethernet, CNC 120 may publish a transmission schedule and may expect it to be executed when first client device 145 begins transmission along the data path. However, due to a stochastic nature of wireless link 160, CNC 120 may not be able to generate such a transmission schedule for wireless link 160.

From stage 230, where CNC 120 provides the proposed transmission schedule to the WLC (e.g., controller 105) of wireless link 160, method 200 may advance to stage 240 where CNC 120 may receive a confirmation from the WLC (e.g., controller 105) that the proposed transmission schedule may be met. The WLC (e.g., controller 105) or first AP 135 may communicate with first client device 145 as a proxy for CNC 120. First AP 135 or the WLC (e.g., controller 105) may examine a current network condition or state of wireless link 160, first AP 135, and first client device 145. The current network condition or state may include Received Signal Strength Indicator (RSSI), Signal to Noise Ratio (SNR), Channel State Information (CSI) (i.e., known channel properties of wireless link 160), a data rate, etc. First AP 135 or the WLC (e.g., controller 105) may determine that the proposed transmission schedule may be met when the current network condition over the configurable interval may allow for at least the amount or volume of data to be exchanged and the proposed transmission schedule requested, including an initial stochasticity margin. If first AP 135 or the WLC (e.g., controller 105) determines that the proposed transmission schedule may be met, it may send a confirmation to CNC 120 that the proposed transmission schedule may be met.

If first AP 135 or the WLC (e.g., controller 105), in some embodiments, determines that the proposed transmission schedule may not be met, it may report back to CNC 120 that the proposed transmission schedule may not be met. CNC 120, in such embodiments, may then send a modified proposed transmission schedule. First AP 135 or the WLC (e.g., controller 105) may determine that the modified proposed transmission schedule may be met and may send a confirmation to CNC 120 that the modified proposed transmission schedule may be met.

Once CNC 120 receives the confirmation that the proposed transmission schedule may be met in stage 240, method 200 may continue to stage 250 where the proposed transmission schedule may be configured. The proposed transmission schedule may be configured in response to receiving the confirmation that the proposed transmission schedule may be met on wireless link 160. First AP 135 or the WLC (e.g., controller 105), for example, may instruct first client device 145 to begin sending the time sensitive traffic on wireless link 160 to first AP 135 based on the proposed transmission schedule. From stage 250, where the proposed transmission schedule is configured, method 200 may then end at stage 260.

As transmission begins, the network condition of wireless link 160 may be monitored continually. Wireless link 160 may be stochastic, and even if the agreed transmission schedule may be possible at a time to, it may not be possible at a later time (i.e., time $t_n$) to break latency requirements of TSN 115. This may be a likely scenario as first client device 145 may likely be mobile and may experience changing network conditions. Considering this, in an effort to ensure the transmission schedule may continually be met, first AP 135 or the WLC (e.g., controller 105) may continually refresh monitoring of the network condition of wireless link 160 faster than first client device 145 may move. For example, if the network condition is degrading, if all other variables may be held constant, it may become difficult for first client device 145 and first AP 135 to meet the transmission schedule. To address this, first AP 135 or the WLC (e.g., controller 105) may anticipate a degradation of the network condition and may make adjustments to wireless link 160 or adapt the transmission schedule.

Figure 3:
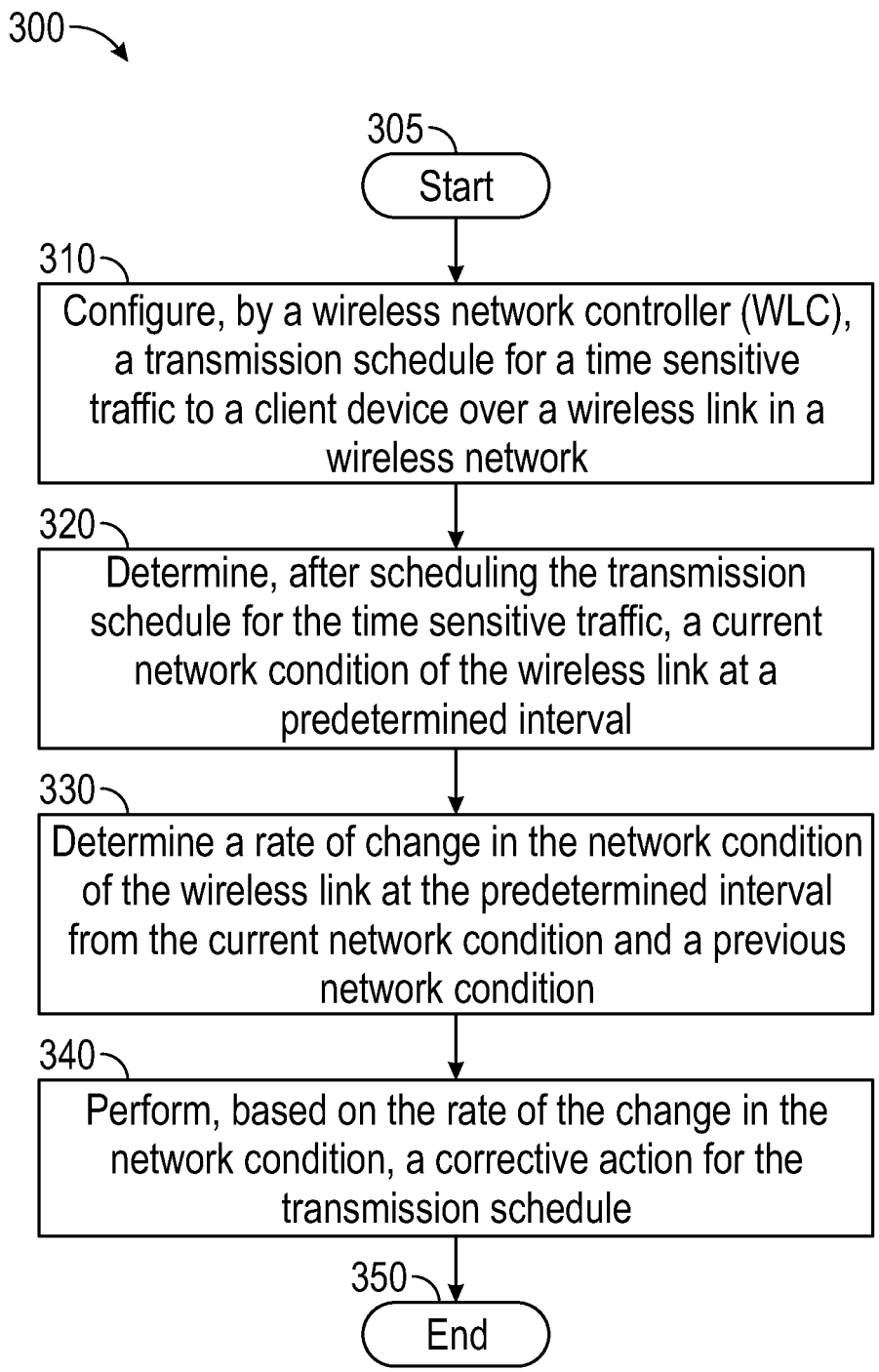
FIG. 3 is a flow diagram of a method for adapting transmission schedules in a radio frequency environment.

FIG. 3 is a flow chart setting forth the general stages involved in a method 300 consistent with embodiments of the disclosure for adapting transmission schedules in an RF environment. Method 300 may be implemented using the WLC (e.g., controller 105) or one of the plurality of APs as described in more detail above with respect to FIG. 1. Ways to implement the stages of method 300 will be described in greater detail below.

Method 300 may begin at starting block 305 and proceed to stage 310 where the WLC (e.g., controller 105) may configure a transmission schedule for time sensitive traffic to a client device (e.g., first client device 145) over wireless link 160 in a wireless network (e.g., coverage environment 110). For example, first AP 135 or the WLC (e.g., controller 105) may instruct first client device 145 to begin sending the time sensitive traffic through wireless link 160 based on a transmission schedule provided by CNC 120.

From stage 310, where the WLC (e.g., controller 105) configures the transmission schedule for the time sensitive traffic to the client device (e.g., first client device 145) over wireless link 160, method 300 may proceed to stage 320 where the WLC (e.g., controller 105) may determine a current network condition of wireless link 160 at a predetermined interval. The WLC (e.g., controller 105) may determine the current network condition of wireless link 160 after configuring the transmission schedule for the time sensitive traffic. The WLC (e.g., controller 105), for example, after configuring the transmission schedule for the time sensitive traffic at time $t_0$ may determine the current network condition of wireless link 160 at time $t_1$, time $t_2$, time $t_3$, etc. The network condition may include RSSI, SNR, CSI (i.e., known channel properties), a data rate, etc.

Once the WLC (e.g., controller 105) determines the current network condition of wireless link 160 at stage 320, method 300 may continue to stage 330 where the WLC (e.g., controller 105) may determine a rate of change in the network condition of wireless link 160 at the predetermined interval. The WLC (e.g., controller 105) may determine the rate of a change in the network condition of wireless link 160 from the current network condition and a previous network condition, and adapt the transmission schedule based on the rate of change in the network condition.

Because of a stochastic nature of wireless link 160, the network condition that may impact the transmission schedule may continually be monitored to determine its impact on the transmission schedule. A record may be made of the network condition at an initial state (i.e., the time to). Knowing that the transmission schedule may be sensitive to changing network condition as time progresses, and that first client device 145 may be mobile, a predictive measurement may be made to determine if the network condition may be degrading or improving as first client device 145 moves. Thus, at the predetermined interval, the WLC (e.g., controller 105) or first AP 135 may measure a rate (i.e., slope) of the change of the network condition for wireless link 160.

Upward changes (i.e., improvement in the network condition) may be ignored and the WLC (e.g., controller 105) or first AP 135 may continue monitoring the network condition. Downward changes may be examined to verify if it may lead to degradation beyond the requested traffic schedule and volume. To do this, WLC (e.g., controller 105) or first AP 135 may employ the Lyapunov model (i.e., the Lyapunov characteristic exponent). The Lyapunov characteristic exponent may be a mathematical model that may be used to determine if the network condition is diverging or converging from the initial state at a predetermined interval. The Lyapunov characteristic exponent may compare two (or more) seemingly quasi-parallel series of changes and may produce a prediction. The prediction may include whether these trajectories are the same (i.e., the degradation slopes are the same as a degradation model that may show that the degradation is temporary and above a schedule threshold) or diverge (the network condition may cross the schedule threshold). In this way, the Lyapunov characteristic exponent may be used to determine if the changing network condition trend may create demands that may not be met by the configured transmission schedule. The Lyapunov characteristic exponent is just an example and other predictive models may be used.

From stage 330, where the WLC (e.g., controller 105) determines the rate of the change in the network condition of wireless link 160, method 300 may proceed to stage 340 where the WLC (e.g., controller 105) may perform a corrective action for the transmission schedule based on the rate of the change in the network condition. At a point, for example, the Lyapunov characteristic exponent may indicate that the degradation may be approaching a point beyond adherence to the transmission schedule, with some allowable stochasticity margin. At this point, first AP 135 or the WLC (e.g., controller 105) may invoke a series of changes to improve conditions for the TSN transmission. The changes may include, for example, but is not limited to: i) invoking 802.11be Multi-Link Operation (MLO) (i.e., requesting first client device 145 to begin transmission on multiple uplink radios); ii) widening Resource Unit (RU) allocation to first client device 145; iii) de-prioritizing non-TSN client devices; iv) forcing a roam to a another AP (i.e., second AP 140) that is able to meet the transmission schedule; or v) decreasing AP-to-AP interference via the IEEE 802.11be Multi-AP coordination (MAPC) capability (e.g. if Signal to Interference and Noise Ratio (SINR) is below target).

As the changes are invoked, the Lyapunov characteristic exponent calculation may be performed to determine if the network condition for first client device 145 may be improving or likely to continue to degrade. First AP 135 or the WLC (e.g., controller 105) may determine, after performing the corrective action for the transmission schedule, that the network condition is not improving. If degradation beyond a point of adherence to the transmission schedule, first AP 135 or the WLC (e.g., controller 105) may communicate with first client device 145 and CNC 120. First AP 135 or the WLC (e.g., controller 105) may inform CNC 120 and first client device 145 that TSN services are no longer possible for first client device 145 until the network conditions improve. CNC 120 may stop transmission of the time sensitive traffic in response to the network condition not improving after performing the corrective action. From stage 340, where the WLC (i.e., controller 105) performs the corrective action for the transmission schedule for the time sensitive traffic based on the rate of the change in the network condition, method 300 may then end at stage 350.

In a reverse direction (i.e., from a wired station (e.g., first AP 135) to a wireless station (e.g., first client device 145)), the reverse may happen. That is, before the wired station (e.g., first AP 135) may transmit, CNC 120 may receive an acknowledgement from first AP 135 or the WLC (e.g., controller 105), as its proxy, that wireless link 160 may meet the proposed transmission schedule, and after this acknowledgement, transmission may begin. If the network condition degrades, first AP 135 or the WLC (e.g., controller 105) may inform CNC 120, which may stop the scheduled transmission.

In accordance with an embodiment, the WLC (e.g., controller 105) or first AP 135 may utilize Reinforcement Learning (RL) to build a predictor model. The predictor model may allow the WLC (e.g., controller 105) or first AP 135 to determine how the network condition may affect possible transmission schedules. The predictor model may allow the WLC (e.g., controller 105) or first AP 135 to collect various network conditions and may determine using a synthetic traffic if the transmission schedule may be met in operating environment 100. In time, the predictor model may be trained and may be used as a classifier to communicate with CNC 120, informing CNC 120 if the proposed transmission schedule may be met or not.

Figure 4:
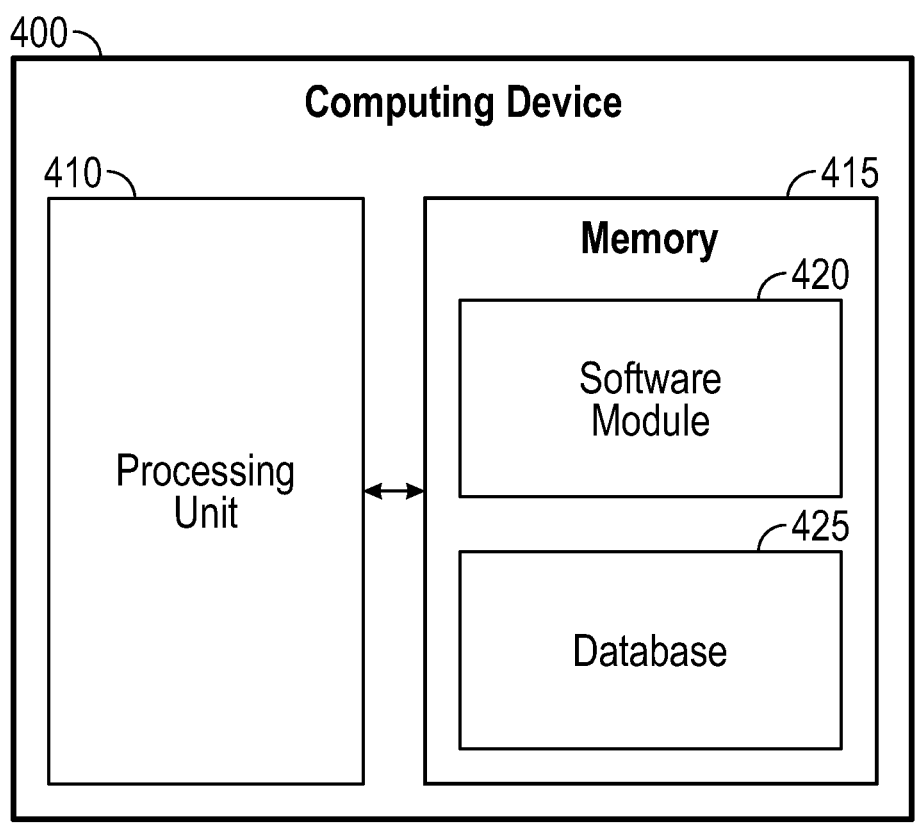
FIG. 4 is a block diagram of a computing device.

FIG. 4 shows computing device 400. As shown in FIG. 4, computing device 400 may include a processing unit 410 and a memory unit 415. Memory unit 415 may include a software module 420 and a database 425. While executing on processing unit 410, software module 420 may perform, for example, processes for adapting transmission schedules in radio frequency environment as described above with respect to FIG. 2 and FIG. 3. Computing device 400, for example, may provide an operating environment for controller 105, CNC 120, CUC 125, first AP 135, second AP 140, first client device 145, second client device 150, and third client device 155. Controller 105, CNC 120, CUC 125, first AP 135, second AP 140, first client device 145, second client device 150, and third client device 155 may operate in other environments and are not limited to computing device 400.

Computing device 400 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 400 may comprise any computer operating environment, such as hand-held devices, multiprocessor systems, microprocessor-based or programmable sender electronic devices, minicomputers, mainframe computers, and the like. Computing device 400 may also be practiced in distributed computing environments where tasks are performed by remote processing devices. The aforementioned systems and devices are examples, and computing device 400 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on, or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 400 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

The invention claimed is:

1. A method comprising:
    determining, by a Central Network Controller (CNC) of a Time Sensitive Network (TSN), that a data path to a client device comprises a wireless link;
    generating, by the CNC of the TSN in response to determining that the data path to the client device comprises the wireless link, a proposed transmission schedule for a time sensitive traffic to the client device through the wireless link;
    providing, by the CNC, the proposed transmission schedule to a Wireless Network Controller (WLC) of the wireless link, wherein providing, by the CNC, the proposed transmission schedule to the WLC of the wireless link comprises providing, by the CNC, the proposed transmission schedule to the WLC of the wireless link as a request and not as a configuration;
    receiving, by the CNC from the WLC, a confirmation that the proposed transmission schedule can be met; and
    configuring, in response to receiving the confirmation, the proposed transmission schedule.

2. The method of claim 1, wherein receiving, by the CNC from the WLC, the confirmation that the proposed transmission schedule can be met comprises receiving, by the CNC from the WLC, the confirmation that the proposed transmission schedule can be met in response to:
    determining a current network condition of the wireless link between an Access Point (AP) and the client device; and
    determining, based on the current network condition of the wireless link between the AP and the client device, that the proposed transmission schedule can be met over a configurable interval including a stochasticity margin.

3. The method of claim 2, further comprising determining the current network condition at a predetermined interval.

4. The method of claim 3, further comprising determining a rate of a change in the network condition of the wireless link at the predetermined interval from the current network condition and a previous network condition.

5. The method of claim 4, further comprising performing, based on the rate of the change in the network condition, a corrective action for the transmission schedule for the time sensitive traffic.

6. The method of claim 5, wherein performing the corrective action comprises widening Resource Unit (RU) allocation to the client device.

7. The method of claim 1, wherein configuring, in response to receiving the confirmation, the proposed transmission schedule comprises instructing the client device to begin using an Access Point (AP) of the wireless link to send the time sensitive traffic.

8. A system comprising:
a memory storage; and
a processing unit coupled to the memory storage, wherein the processing unit is operative to:
determine that a data path to a client device comprises a wireless link;
generate, in response to determining that the data path to the client device comprises the wireless link, a proposed transmission schedule for a time sensitive traffic to the client device through the wireless link;
provide the proposed transmission schedule to a Wireless Network Controller (WLC) of the wireless link, wherein the processing unit being operative to provide the proposed transmission schedule to the WLC of the wireless link comprises the processing unit being operative to provide the proposed transmission schedule to the WLC of the wireless link as a request and not as a configuration;
receive, from the WLC, a confirmation that the proposed transmission schedule can be met; and
configure, in response to receiving the confirmation, the proposed transmission schedule.

9. The system of claim 8, wherein the system comprises a Central Network Controller (CNC) of a Time Sensitive Network (TSN).

10. The system of claim 8, wherein the wireless link is between the client device and an Access Point (AP).

11. The system of claim 8, wherein the processing unit being operative to receive the confirmation that the proposed transmission schedule can be met comprises the processing unit being operative to receive the confirmation that the proposed transmission schedule can be met in response to:
determining a current network condition of the wireless link between an Access Point (AP) and the client device; and
determining, based on the current network condition of the wireless link between the AP and the client device, that the proposed transmission schedule can be met over a configurable interval including a stochasticity margin.

12. The system of claim 8, wherein the processing unit being operative to configure, in response to receiving the confirmation, the proposed transmission schedule comprises the processing unit being operative to instruct the client device to begin using an Access Point (AP) of the wireless link to send the time sensitive traffic.

13. A non-transitory computer-readable medium that stores a set of instructions which when executed perform a method executed by the set of instructions comprising:
configuring, by a Wireless Network Controller (WLC), a transmission schedule for a time sensitive traffic to a client device over a wireless link in a wireless network, wherein the proposed transmission schedule is provided to the WLC of the wireless link as a request and not as a configuration;
determining, after configuring the transmission schedule for the time sensitive traffic, a current network condition of the wireless link at a predetermined interval;
determining a rate of a change in the network condition of the wireless link at the predetermined interval from the current network condition and a previous network condition; and
performing, based on the rate of the change in the network condition, a corrective action for the transmission schedule.

14. The non-transitory computer-readable medium of claim 13, wherein determining the rate of the change in the network condition of the wireless link at the predetermined interval from the current network condition and the previous network condition comprises determining that the network condition is degrading.

15. The non-transitory computer-readable medium of claim 14, wherein determining that the network condition is degrading comprises determining that the degradation is approaching a point beyond adherence to the transmission schedule.

16. The non-transitory computer-readable medium of claim 13, wherein performing the corrective action comprises instructing the client device to begin transmission on multiple uplink radios.

17. The non-transitory computer-readable medium of claim 13, wherein performing the corrective action comprises widening Resource Unit (RU) allocation to the client device.

18. The non-transitory computer-readable medium of claim 13, wherein performing the corrective action comprises forcing the client device to a different Access Point (AP).

19. The non-transitory computer-readable medium of claim 13, further comprising:
determining, after performing the corrective action for the transmission schedule, that the network condition is not improving; and
stopping transmission of the time sensitive traffic in response to determining that the network condition is not improving after performing the corrective action.

* * * * *